(12) United States Patent
Kruse (10) Patent No.: US 8,677,701 B2
(45) Date of Patent: Mar. 25, 2014

(54) ATTACHING SOLAR COLLECTORS TO A STRUCTURAL FRAMEWORK UTILIZING A FLEXIBLE CLIP

(75) Inventor: John S. Kruse, Florissant, MO (US)

(73) Assignee: The Boeing Company, Chicago, IL (US)

( * ) Notice: Subject to any disclaimer, the term of this patent is extended or adjusted under 35 U.S.C. 154(b) by 836 days.

(21) Appl. No.: 12/237,651

(22) Filed: Sep. 25, 2008

(65) Prior Publication Data

US 2010/0071755 A1 Mar. 25, 2010

(51) Int. Cl.
*E04D 13/18* (2006.01)
*E04G 17/00* (2006.01)

(52) U.S. Cl.
USPC ........................................ 52/173.3; 52/745.19

(58) Field of Classification Search
USPC .............................. 52/173.3, 745.19; 136/251
See application file for complete search history.

(56) References Cited

U.S. PATENT DOCUMENTS

| 4,103,672 | A | * | 8/1978 | Meyer | 126/604 |
|---|---|---|---|---|---|
| 4,103,674 | A | * | 8/1978 | Robinson et al. | 126/641 |
| 4,189,881 | A | * | 2/1980 | Hawley | 52/91.3 |
| 5,252,141 | A | * | 10/1993 | Inoue et al. | 136/251 |
| 5,406,936 | A | * | 4/1995 | Hirai et al. | 126/623 |
| 5,480,494 | A | * | 1/1996 | Inoue | 136/251 |
| 5,589,006 | A | * | 12/1996 | Itoyama et al. | 136/248 |
| 5,697,192 | A | * | 12/1997 | Inoue | 52/173.3 |
| 5,706,617 | A | * | 1/1998 | Hirai et al. | 52/173.3 |
| 6,182,403 | B1 | * | 2/2001 | Mimura et al. | 52/173.3 |
| 6,269,596 | B1 | * | 8/2001 | Ohtsuka et al. | 52/173.3 |
| 6,323,416 | B1 | * | 11/2001 | Komori et al. | 136/259 |
| 6,672,018 | B2 | * | 1/2004 | Shingleton | 52/173.3 |
| 6,979,771 | B2 | * | 12/2005 | Mimura | 136/244 |
| 7,780,472 | B2 | * | 8/2010 | Lenox | 439/567 |
| 8,336,277 | B1 | * | 12/2012 | Rego et al. | 52/747.1 |
| 8,347,565 | B2 | * | 1/2013 | Carroll | 52/173.3 |
| 8,371,076 | B2 | * | 2/2013 | Jones et al. | 52/173.3 |
| 2005/0109384 | A1 | * | 5/2005 | Shingleton et al. | 136/244 |
| 2008/0244881 | A1 | * | 10/2008 | Zante | 24/530 |
| 2009/0242014 | A1 | * | 10/2009 | Leary | 136/251 |
| 2010/0236183 | A1 | * | 9/2010 | Cusson et al. | 52/645 |
| 2011/0094559 | A1 | * | 4/2011 | Potter et al. | 136/244 |
| 2011/0265860 | A1 | * | 11/2011 | Ciasulli et al. | 136/251 |
| 2012/0233940 | A1 | * | 9/2012 | Perkins et al. | 52/173.3 |
| 2012/0266946 | A1 | * | 10/2012 | West et al. | 136/251 |
| 2013/0008103 | A1 | * | 1/2013 | Sagayama | 52/173.3 |

* cited by examiner

*Primary Examiner* — Joshua J Michener
*Assistant Examiner* — Elizabeth A Plummer
(74) *Attorney, Agent, or Firm* — Hope Baldauff, LLC (57) ABSTRACT

Methods and apparatuses described herein provide for the attachment of solar collectors to a structural framework in a solar array assembly. A flexible clip is attached to either end of each solar collector and utilized to attach the solar collector to the structural framework. The solar collectors are positioned to allow a member of the framework to engage a pair of flexible clips attached to adjacent solar collectors during assembly of the solar array. Each flexible clip may have multiple frame-engaging portions, each with a flange on one end to cause the flexible clip to deflect inward when engaged by the framework member during assembly and to guide each of the frame-engaging portions into contact with a surface of the framework member for attachment.

7 Claims, 6 Drawing Sheets

ATTACHING SOLAR COLLECTORS TO A STRUCTURAL FRAMEWORK UTILIZING A FLEXIBLE CLIP

GOVERNMENT RIGHTS

The invention was made with Government support under Contract Number DE-FC36-07GO17052 awarded by the U.S. Department of Energy. The Government has certain rights in this invention.

BACKGROUND

The generation of solar power often requires a significant number of solar cell or solar collectors be utilized in order to collect sufficient solar energy for many applications. Several solar collectors may be assembled into individual solar arrays, and a large number of solar arrays may be required to generate sufficient solar power for a particular application. Due to the large number of solar arrays that may be required, it is essential that the arrays be assembled utilizing an efficient manufacturing process in order to make the generation of solar power economically practical.

A critical factor in the efficiency of an individual solar array is the alignment of the solar collectors so that each solar collector is at an optimal angle to the sun during operation of the solar array. Each solar collector attached to the structural framework of the solar array must be aligned with respect to the others within a small angular tolerance. Normal manufacturing tolerances or dimensional variations inherent in the framework and the solar collectors typically require a means to adjust or compensate for this tolerance to meet the alignment requirement. Traditionally, these adjustments were made using solid or liquid shims to remove gaps between the components due to variations in their shape.

However, the shimming process reduces the efficiency of the manufacturing process due to the additional time required to apply a suitable shim for each location and, in the case of liquid shims, to cure the shim. Another solution is to utilize connecting hardware that allows adjustment of the angle of each solar collector in the assembly. This additional hardware, however, may result in additional complexity and significantly higher cost of manufacturing for each solar array, and further reduces the efficiency of assembly by requiring every solar collector in the solar array to be measured and adjusted to proper angular position before the array can be utilized.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods and apparatuses described herein provide for the attachment of solar collectors to a structural framework in a solar array assembly. According to aspects presented herein, a flexible attachment device, or flexible clip, is provided for attaching the solar collectors to the structural framework. The flexible attachment device is shaped to have a collector-engaging portion for attaching to a solar collector, a biasing portion configured to allow the flexible attachment device to flex inward towards the solar collector during assembly, and a number of frame-engaging portions for attaching the flexible attachment device to the structural framework. In one aspect, each of the frame-engaging portions also has a guide portion or flange attached to one end to cause the flexible attachment device to flex inward when engaged by the structural framework during assembly and to guide each of the frame-engaging portions to contact a surface of the structural framework for attachment.

According to further aspects presented herein, a method for attaching solar collectors to a structural framework utilizing the flexible attachment device is provided. The method entails attaching a flexible attachment device to each end of the solar collectors and then positioning the solar collectors in an alignment fixture configured to align the solar collectors for assembly. The solar collectors are positioned within the alignment fixture such that pairs of flexible attachment devices attached to adjacent solar collectors are positioned to engage a member of the structural framework between the pairs when the framework is positioned for assembly. Once the member of the structural framework is positioned between adjacent pairs of flexible attachment devices, the flexible attachment devices are attached to the frame.

In yet a further aspect, a solar array assembly is disclosed including a structural framework, a number of solar collectors, and a number of flexible attachment devices attached to either end of the solar collectors. The solar collectors are positioned in such a way that a member of the structural framework is located between pairs of flexible attachment devices attached to adjacent solar collectors, with the flexible attachment devices attached to the member.

The features, functions, and advantages discussed herein can be achieved independently in various embodiments of the present invention or may be combined in yet other embodiments, further details of which can be seen with reference to the following description and drawings.

DETAILED DESCRIPTION

The following detailed description is directed to apparatus and methods for attaching solar collectors to a structural framework in a solar array assembly. Utilizing the concepts and technologies described herein, a flexible clip is utilized to attach the solar collectors to the structural framework. The flexible clip is manufactured as a single piece of flexible material in a shape that allows for the flexible clip to account for the deformities and inconsistencies in the structural framework and solar collectors, while ensuring the solar collectors remain precisely aligned after assembly of the solar array. This allows for less expensive structural frameworks to be utilized as well as providing a more efficient manufacturing process for the solar array assembly. These and other advantages and features will become apparent from the description of the various embodiments below.

Figure 1:
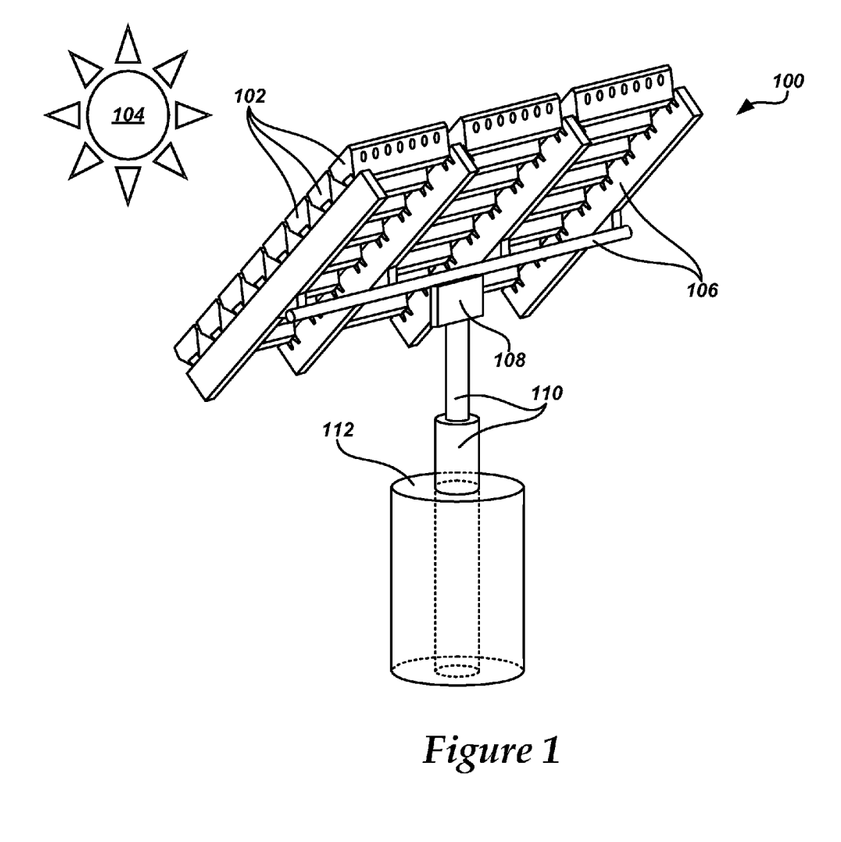
FIG. 1 is a perspective view of a solar array assembly, according to embodiments.

In the following detailed description, references are made to the accompanying drawings that form a part hereof, and that show by way of illustration specific embodiments or examples. Referring now to the drawings, in which like numerals represent like elements through the several figures, a method for using a flexible clip to attach solar collectors to a structural framework will be described. FIG. 1 shows an exemplary solar array 100, according to embodiments described herein, consisting of a number of solar collectors 102. The solar collectors may be configured to capture the thermal energy from the sun 104 and transfer the energy into a liquid or gas, or each solar collector 102 may contain a number of photovoltaic cells that convert the solar energy of the sun 104 into electricity. The solar collectors 102 are mounted to a structural framework 106 such that they are all aligned to point to the sun 104 during operation of the solar array 100. As discussed above, the proper alignment of the solar collectors 102 to the sun is critical to the efficient operation of the array 100.

The structural framework 106 may be further attached to a tracking mechanism 108, which allows the solar collectors 102 in the array 100 to remain properly aligned with the sun 104 as it moves across the sky during a day. The tracking mechanism 108 may consist of multiple electric or hydraulic motors that allow the solar array 100 to be rotated along multiple axes. The tracking mechanism 108 may be further connected to a stationary mounting pole 110 that is fixed to a base 112. The base 112 may be any structure that provides a stable foundation for the attachment of the solar array 100, including, but not limited to, the roof of a building or a concrete footing in the ground.

Figures 2A, 2B:
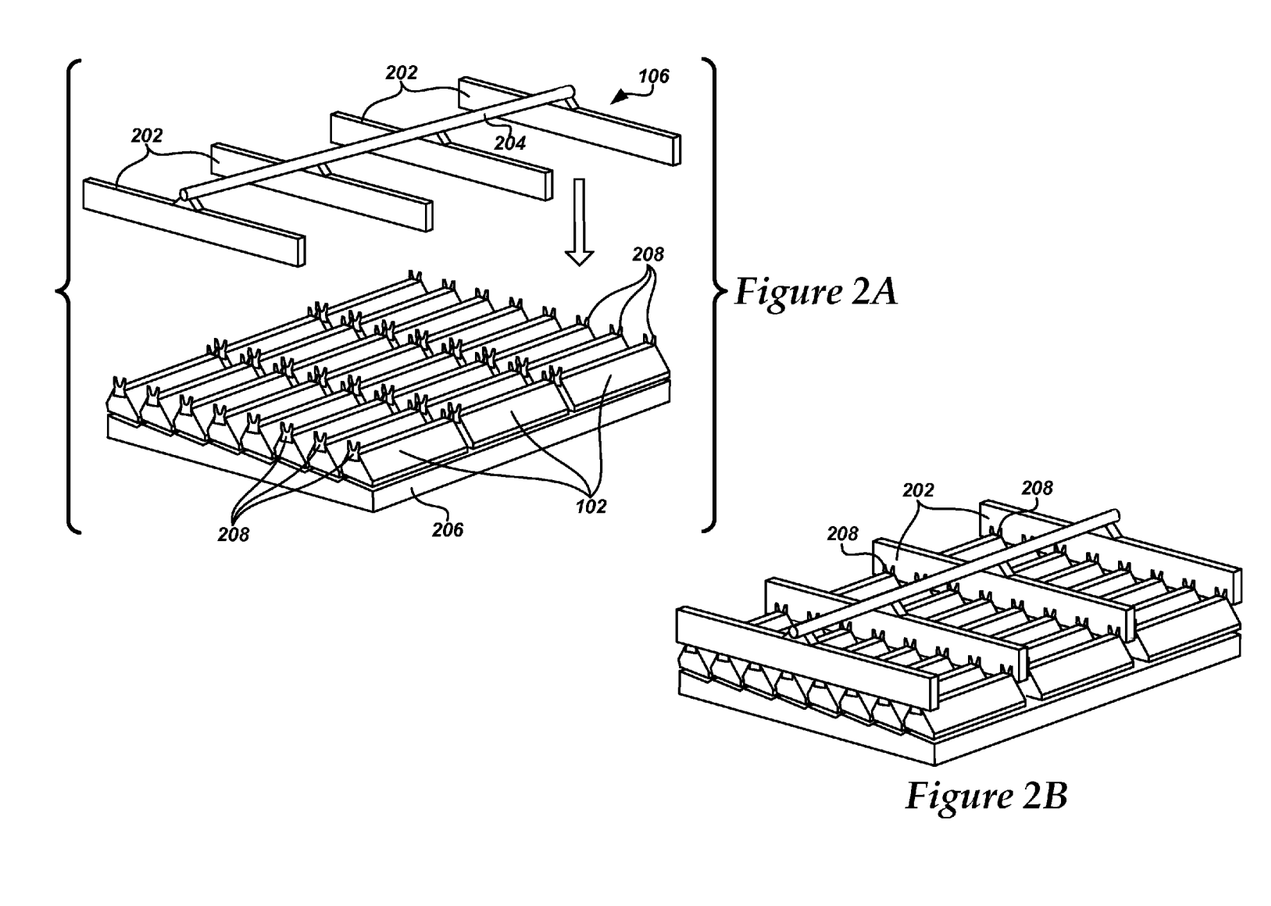
FIGS. 2A and 2B are perspective views showing further details of the solar array assembly, according to embodiments.

FIG. 2A provides further details regarding the assembly of the solar array 100. The structural framework 106 may consist of a number of support members 202 attached to a primary beam 204. The solar collectors 102 may be connected to the support members 202 while the primary beam 204 is attached to the tracking mechanism 108. The primary beam 204 and support members 202 may be constructed of steel or other material with sufficient rigidity to ensure that the solar collectors 102 remain properly aligned once attached to the structural framework 106.

According to one embodiment, the solar collectors 102 are placed in a jig or alignment fixture 206 prior to assembly of the solar array 100. The alignment fixture 206 provides for precise alignment of the solar collectors 102 before attachment to the structural framework 106. The alignment fixture 206 may consist of a shaped tray in which the solar collectors 102 are laid prior to the structural framework 106 being moved into position for attachment, as will be described in more detail below in regard to FIG. 5. According to embodiments, a flexible clip or flexible attachment device 208 is attached to the ends of each solar collector 102. As will be described in more detail below, the flexible attachment devices 208 facilitate the attachment of the solar collectors 102 to the support members 202 for final assembly of the solar array 100, as illustrated in FIG. 2B.

Figure 3A:
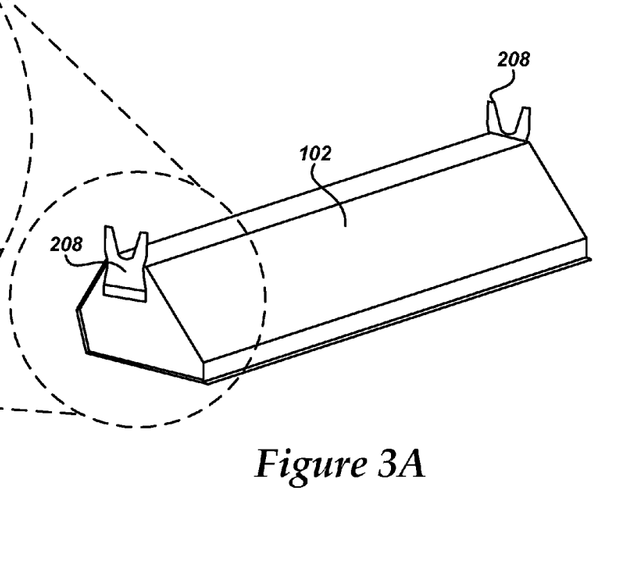
FIG. 3A is a perspective view showing an exemplary solar collector, according to embodiments.
Figure 3B:
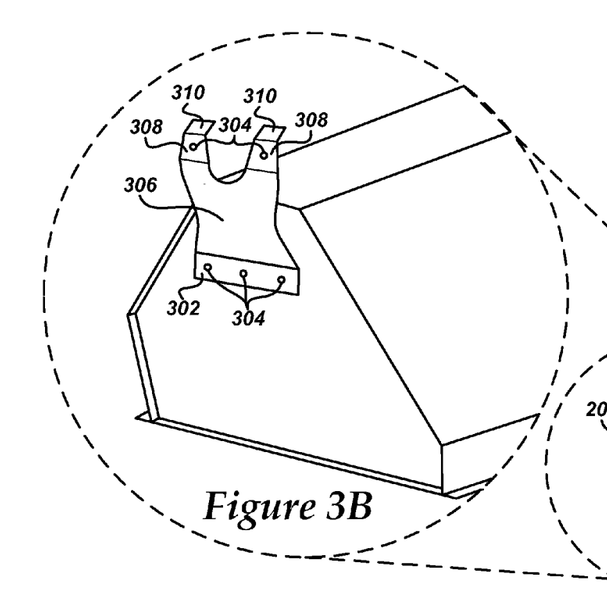
FIG. 3B is an enlarged view of an end of the solar collector of FIG. 3A, showing details of the flexible clip used to attach the solar collector to the structural framework, according to embodiments.

As illustrated in FIGS. 3A and 3B, a flexible attachment device 208 may be attached to each end of a solar collector 102. In one embodiment, the flexible attachment device 208 is constructed of a continuous piece of flexible material and shaped in such a way to divide the flexible attachment device 208 into four distinct elements or portions. A collector-engaging portion 302 is located at one end of the flexible attachment device 208 and provides a continuous flat surface for attachment of the flexible attachment device 208 to the solar collector 102. In one embodiment, the collector-engaging portion 302 may have a number of holes or apertures 304 to allow for attachment to the solar collector 102 using fasteners.

Extending from the collector-engaging portion 302 of the flexible attachment device 208 is a biasing portion 306. The biasing portion 306 extends from the collector-engaging portion 302 at an outward angle with respect to the surface of the attached solar collector 102. The biasing portion 306 allows the flexible attachment device 208 to flex inward towards the solar collector 102 during assembly of the solar array, as will be discussed in more detail below in regard to FIGS. 4A and 4B. One or more frame-engaging portions 308 of the flexible attachment device 208 are attached to the opposite end of the biasing portion 306 from the collector-engaging portion 302. The frame-engaging portions 308 provide a flat surface for attachment of the flexible attachment device 208 to the support members 202 of the structural framework 106. As with the collector-engaging portion 302, each frame-engaging portion 308 may have a hole or aperture 304 to allow for attachment of the flexible attachment device 208 to the support members 202 using fasteners.

According to one embodiment, the flexible attachment device 208 also has one or more flanges or guide portions 310 extending from each frame-engaging portion 308 at an angle towards the attached solar collector 102. The guide portion 310 allows the flexible attachment device 208 to flex inward when the guide portion 310 is engaged by the support member 202 during assembly. The guide portion 310 may further aid in guiding the frame-engaging portion 308 into contact with the surface of the support member 202 for proper attachment.

Figure 4A:
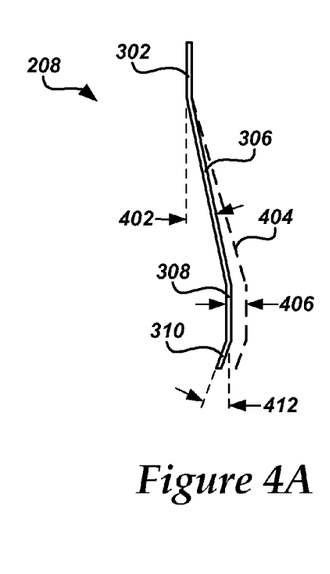
FIG. 4A is a side view showing further details of the flexible clip used to attach the solar collectors to the structural framework, according to embodiments.
Figure 4B:
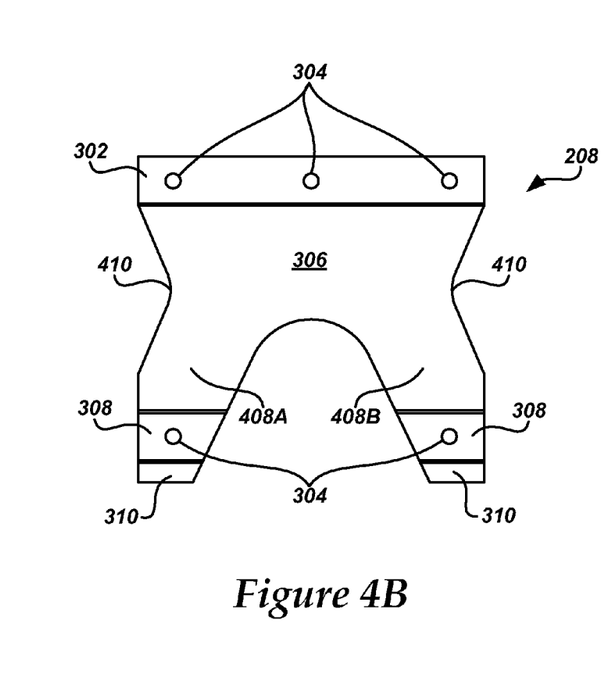
FIG. 4B is a front view showing further details of the flexible clip used to attach the solar collectors to the structural framework, according to embodiments.

FIGS. 4A and 4B illustrate additional details of the flexible attachment device 208, according to embodiments. As discussed above, the collector-engaging portion 302 is flat, allowing the flexible attachment device 208 to be securely attached to a corresponding flat surface of the solar collector 102. According to one embodiment, the collector-engaging portion 302 has a number of apertures 304 to allow for attachment to the solar collector 102 using fasteners. The biasing portion 306 extends from the collector-engaging portion 302 at a bias angle 402 away from the surface of the solar collector 102. The bias angle 402 illustrated in FIG. 4A represents the angle of the biasing portion 306 relative to the collector-engaging portion 302 in the installed state of the flexible attachment device 208. This bias angle 402 ensures the attached solar collector 102 is properly positioned with respect to the support member 202 during assembly of the solar array 100. The bias angle 402 also provides the correct orientation of the frame-engaging portions 308 such that the frame-engaging portions 308 properly contact the support members 202 to allow the secure attachment of the flexible attachment device 208 to the structural framework 106.

The flexible attachment device 208 may be manufactured with an angle between the collector-engaging portion 302 and biasing portion 306 greater than the bias angle 402 of the flexible attachment device 208 in the installed state. For example, the flexible attachment device 208 may be manufactured with a profile represented by line 404 in FIG. 4A. When the flexible attachment device 208 engages the support members 202 during assembly, the flexible attachment device 208 is deflected by a deflection distance 406 such that the required bias angle 402 between the collector-engaging portion 302 and biasing portion 306 is attained, as will be described in more detail below in regard to FIGS. 6A-6C. This allows for proper alignment of the frame-engaging portions 308 with a corresponding surface of the support member 202 while maintaining positive contact between the frame-engaging portions 308 and the support member 202 before attachment.

According to one embodiment, the biasing portion 306 may be bifurcated to create two legs 408A and 408B, each having a frame-engaging portion 308 extending from the leg, as shown in FIG. 4B. This configuration allows the legs 408A, 408B and the corresponding frame-engaging portions 308 to deflect somewhat independently to account for inconsistencies and variations in the surface of the support member 202 during assembly of the solar array 100. In addition, the smaller combined surface area of the frame-engaging portions 308 in this configuration creates less friction when the support member 202 contacts the flexible attachment device 208, thus allowing for easier assembly of the solar array 100. This configuration also allows for the overall flexibility of the flexible attachment device 208 to be tailored to the required flexibility. It will be appreciated that the biasing portion 306 may shaped to have more or fewer legs 408A, 408B than illustrated in FIG. 4B, allowing for more or fewer frame-engaging portions 308 of the flexible attachment device 208.

In addition, the biasing portion 306 of the flexible attachment device 208 may be shaped to include a scallop 410 in either side, reducing the amount of material required to manufacture the flexible attachment device 208 as well as preventing interference between the flexible attachment device 208 and solar collector 102 during assembly.

As discussed above, the frame-engaging portion 308 provides a flat surface for attaching the flexible attachment device 208 to a corresponding flat surface of the support member 202. Each frame-engaging portion 308 may include an aperture 304 to allow for attachment to the support member 202 using a fastener. The guide portion 310 extends from the end of the frame-engaging portion 308 at a flange angle 412 away from the surface of the support member 202. The flange angle 412 may be set to allow the flexible attachment device 208 to easily deflect when the guide portion 310 is engaged by the support member 202. The guide portion 310 also acts to guide the frame-engaging portion 308 into contact with the surface of the support member 202 and to place the frame-engaging portion 308 in proper orientation for attachment to the support member 202, as will be described in more detail below in regard to FIGS. 6A-6C.

As will be appreciated by one skilled in the art, the flexible attachment device 208 may be manufactured from a material that allows the flexible attachment device 208 to have sufficient flexibility in the biasing portion 306 to allow it to deflect during assembly, yet have sufficient rigidity along its breadth to ensure the solar collectors 102 remain properly aligned within the solar array 100 after installation. The choice of material, thickness, and shape of the flexible attachment device 208 may also depend on a number of other factors, including, but not limited to, the nominal deflection distance 406 desired during assembly of the solar array 100, the potential maximum deflection that may occur during assembly, the weight of the attached solar collector 102, the lifespan of the solar array 100, and the possible vibrations or oscillations under wind loads during operation that could potentially cause damage to the solar array 100. According to one embodiment, the flexible attachment device 208 may be manufactured from a high strength low alloy steel with improved formability (HSLAS-F), such as ASTM standard A1008 HSLAS-F grades 70 or 80.

Figure 5:
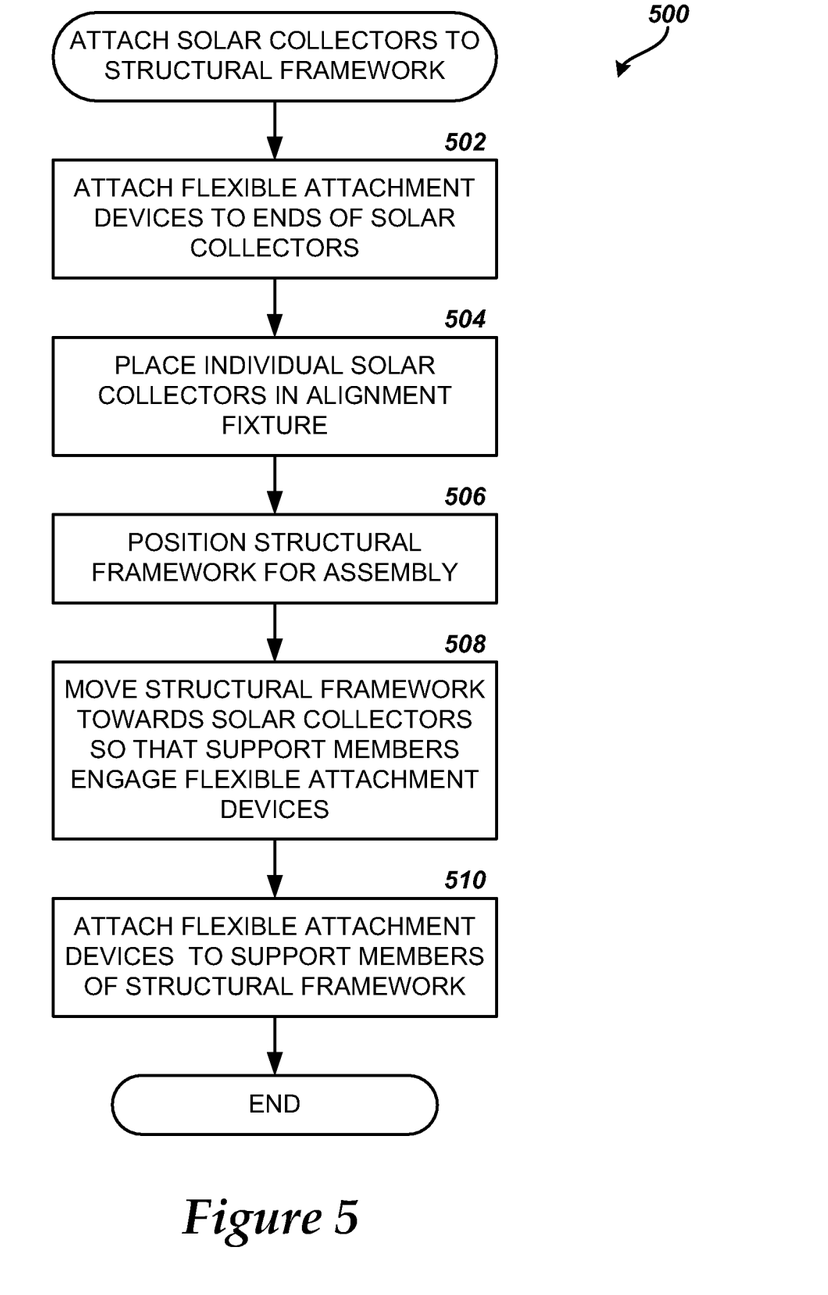
FIG. 5 is a flow diagram illustrating one method for attaching solar collectors to a structural framework, according to embodiments.

FIG. 5 shows one method of attaching solar collectors to a structural framework in a solar array assembly using the flexible attachment device described herein. It should be appreciated that more or fewer operations may be performed than shown in FIG. 5 and described below, and that the operations may be performed in a different order than that described herein.

The method 500 begins at operation 502, where a flexible attachment device 208 is attached to each end of the solar collectors 102 to be assembled in the solar array 100. According to one embodiment, the flexible attachment device 208 is attached to the end of the solar collector using fasteners, as described above in regard to FIGS. 3A and 3B. To reduce the requirement for precision alignment, the flexible attachment device 208 may be positioned with the collector-engaging portion 302 in contact with the attachment surface of the solar collector 102 during assembly, and a number of apertures 304 may be drilled through the collector-engaging portion 302 into the solar collector surface. The fasteners may then be inserted through the apertures to secure the flexible attachment device 208 to the solar collector 102. The fasteners may be rivets, bolts, or machine screws. In another embodiment, the collector-engaging portion 302 may be welded to the solar collector 102 by spot welds, arc welds, or some other welding technique. It will be appreciated that other methods may be utilized to attach the flexible attachment device 208 to the solar collector 102 than those disclosed herein.

From operation 502, the method 500 continues to operation 504, where the solar collectors 102 with the attached flexible attachment devices 208 are placed in the alignment fixture 206 in proper position for assembly of the solar array 100. As discussed above in regard to FIG. 2A, the alignment fixture 206 provides for precise alignment of the solar collectors 102 before attachment to the structural framework 106. The solar collectors 102 may be laid face-down in the alignment fixture 206 with the attached flexible attachment devices 208 facing up to receive the support members 202 or the structural framework 106 from above. The solar collectors 102 may be further positioned such that the flexible attachment devices 208 attached to adjacent solar collectors 102 allow a support member 202 to slide between the adjacent flexible attachment devices 208 and engage the corresponding frame-engaging portions 308 of the flexible attachment devices 208 when the structural framework is lowered into proper position for assembly.

In one embodiment, the alignment fixture 206 is configured to allow the solar collectors 102 to move laterally within the fixture 206 during assembly of the array 100, while maintaining the alignment of the solar collectors 102. This results in less precision being required in the initial placement of the solar collectors 102 in the alignment fixture 206. In another embodiment, the alignment fixture 206 may be further configured so that the solar collectors 102 may be placed in the fixture 206 either manually or automatically by an assembly robot, thus allowing for efficient manufacture of the solar array 100.

Figure 6A:
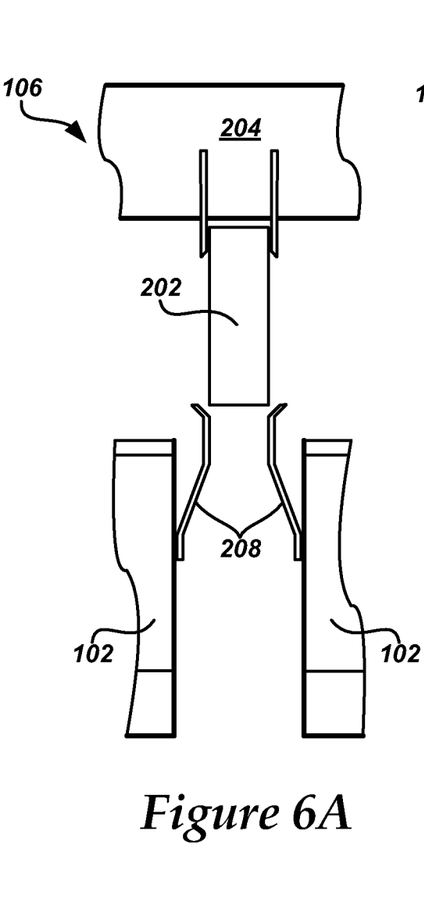
FIGS. 6A-6C are side views showing details of the method for attaching the solar collectors to the structural framework unitizing the flexible clips, according to embodiments.

Next, the method 500 proceeds from operation 504 to operation 506, where the structural framework 106 is properly positioned for assembly of the solar array 100. This may entail positioning the structural framework 106 such that the support members 202 are aligned to be inserted between each pair of flexible attachment devices 208 attached to adjacent solar collectors 102 in the alignment fixture 206, as illustrated in FIG. 6A. In addition, support members 202 on either end of the structural framework 106 will be aligned to engage the flexible attachment devices 208 attached to the outer end of the solar collectors 102 on the outside of the solar array 100. The structural framework may be preassembled such that it can be moved into position as a single piece by an assembly robot, for example.

Figure 6B:
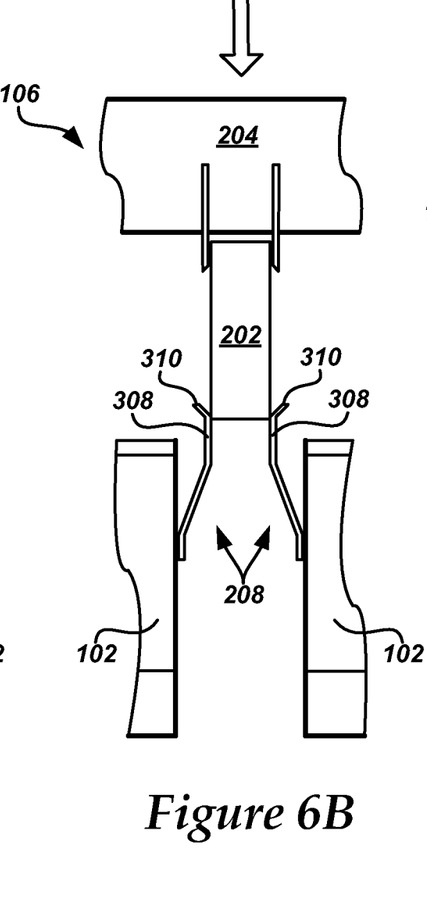
Figure 6C:
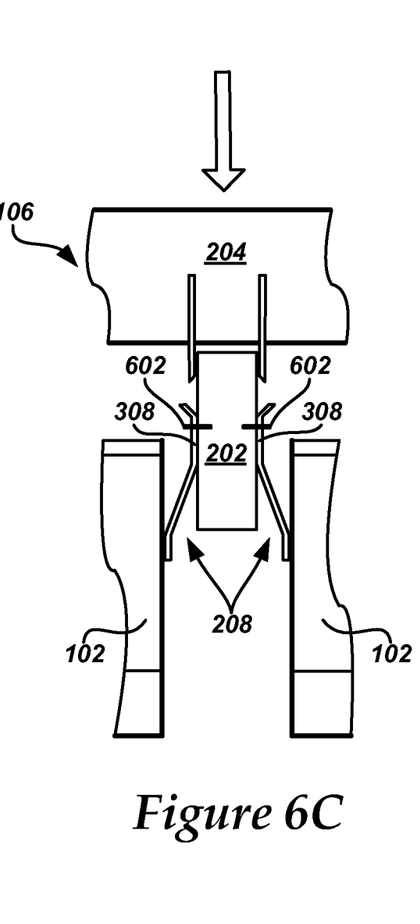

From operation 506, the method 500 proceeds to operation 508, where the structural framework is moved towards the solar collectors 102 in the alignment fixture 206 such that the support members 202 of the structural framework 106 engage the flexible attachment devices 208. As illustrated in FIGS. 6B and 6C, as the support member 202 is slid into position between a pair of flexible attachment devices 208 attached to adjacent solar collectors 102, the support member 202 engages the guide portions 310 of the adjacent flexible attachment devices 208, causing the flexible attachment devices 208 to deflect away from the support member 202. This places the frame-engaging portions 308 of the corresponding flexible attachment devices 208 in the correct orientation to make contact with the surface of the support member 202. Because the flexible attachment devices 208 are flexible, the tension created by the deflection also ensures that the frame-engaging portions 308 remain in positive contact with the surface of the support member 202 while being attached.

The method 500 then proceeds from operation 508 to operation 510, where the flexible attachment devices 208 are attached to the support members 202 of the structural framework 106 to complete the assembly of the solar array 100. According to one embodiment, each flexible attachment device 208 is welded to the support member 202 by spot welds, arc welds, or some other welding technique. In another embodiment, the flexible attachment device 208 is attached to the support member 202 using a fastener, such as the fastener 602 illustrated in FIG. 6C. As described above in regard to operation 502, to reduce the requirement for precision alignment, an aperture 304 may be drilled through the frame-engaging portion 308 of the flexible attachment device 208 and into the support member while the frame-engaging portion 308 is in contact with the attachment surface of the support member 202 during assembly. The fastener 602 may then be inserted through the aperture to secure the flexible attachment device 208 to the support members 202. The fasteners may be rivets, bolts, or machine screws. It will be appreciated that other methods may be utilized to attach the flexible attachment devices 208 to the support members 202 than those disclosed herein. From operation 510, the method 500 ends.

Based on the foregoing, it should be appreciated that apparatus and methods for attaching solar collectors to a structural framework in a solar array assembly are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for attaching a plurality of solar collectors to a structural framework comprising:

attaching a flexible inwardly biasing attachment device to an end surface on a rearward facing side of each of the plurality of solar collectors, the plurality of solar collectors including a forward facing side opposite the rearward facing side, the forward facing side configured to collect solar energy therefrom;

positioning the forward facing side of the plurality of solar collectors forward facing side down in direct contact with an alignment fixture configured to align the plurality of solar collectors for assembly such that a pair of flexible inwardly biasing attachment devices attached to adjacent end surfaces of the plurality of solar collectors are positioned to receive a member of the structural framework between the pair of flexible inwardly biasing attachment devices;

positioning the member of the structural framework to be inserted in between and in direct contact with distal end portions of the pair of flexible inwardly biasing attachment devices such that the member engages a guide portion of the pair of flexible inwardly biasing attachment devices causing the flexible inwardly biasing attachment device to deflect and engage an opposing surface of the member of the structural framework;

inwardly biasing the pair of flexible inwardly biasing attachment devices to engage the member of the structural framework; and attaching each of the pair of flexible inwardly biasing attachment devices to the member of the structural framework.

2. The method of claim 1, wherein attaching the flexible inwardly biasing attachment device to the end surface of each of the plurality of solar collectors comprises:

boring an aperture through the flexible inwardly biasing attachment device and into the end surface of the solar collector; and using a fastener to attach the flexible inwardly biasing attachment device to the solar collector.

3. The method of claim 1, wherein attaching the pair of flexible inwardly biasing attachment devices to the member of the structural framework comprises:

boring an aperture through the flexible inwardly biasing attachment device and into the member of the structural framework; and using a fastener to attach the flexible inwardly biasing attachment device to the member of the structural framework.

4. The method of claim 1, wherein the flexible inwardly biasing attachment devices are constructed of a metal.

5. The method of claim 4, wherein attaching the flexible inwardly biasing attachment device to the end surface of each of the plurality of solar collectors comprises welding the flexible inwardly biasing attachment device to the end surface of the solar collector.

6. The method of claim 4, wherein attaching the pair of flexible inwardly biasing attachment devices to the member of the structural framework comprises welding the flexible inwardly biasing attachment device to the member of the structural framework.

7. The method of claim 4, wherein the metal comprises a high strength low alloy steel.

* * * * *